United States Patent Office 3,328,455
Patented June 27, 1967

3,328,455
REACTION PRODUCT OF A DIPHENOL AND AN ALLYLHALOFORMATE
Seymour Schmukler, Dalton, Mass., assignor to General Electric Company, a corporation of New York
No Drawing. Filed Mar. 15, 1965, Ser. No. 439,971
3 Claims. (Cl. 260—463)

ABSTRACT OF THE DISCLOSURE

A compound that is the reaction product of a 3,3',5,5'-tetraalkyl-2,4,4'-trihydroxybiphenol or 3,3',5,5'-tetraalkyl-4,4'-dihydroxybiphenol and an allylhaloformate.

---

This invention relates to novel reaction products of diphenyls and allyl haloformates. More particularly, this invention relates to reaction products of 3,3',5,5'-tetraalkyl-2,4,4',dihydroxybiphenyls or 3,3',5,5'-tetraalkyl-4,4'-dihydroxybiphenyls and allyl haloformates.

The novel componds of this invention may be represented by the following general formula:

I
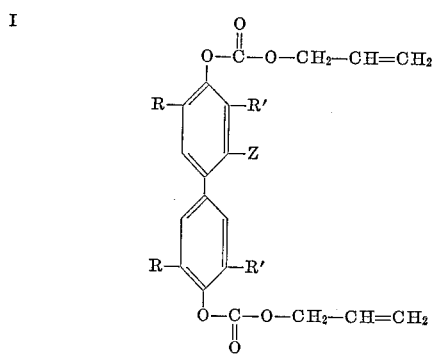

wherein R and R' are monovalent hydrocarbons selected from the group consisting of lower alkyls having up to 4 carbon atoms—i.e., methyl, ethyl, propyl, and butyl. Z is a member selected from the group consisting of hydrogen and the allyl carbonate group attached to the 4 and 4' position on the aromatic nuclei of Formula I. It is to be understood that there may be further substitution on the allyloxy radicals. Such substitution could include the replacement of a hydrogen atom with a lower alkyl or an aryl radical.

The products of my invention are formed by reacting an allyl haloformate with a di- or trihydroxybiphenyl having the folowing general formula:

II
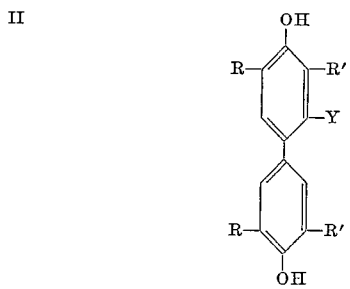

wherein R and R' are the same as in Formula I and Y is a member selected from the group consisting of hydrogen and a hydroxyl group.

The overall reaction may be represented by the following equation:

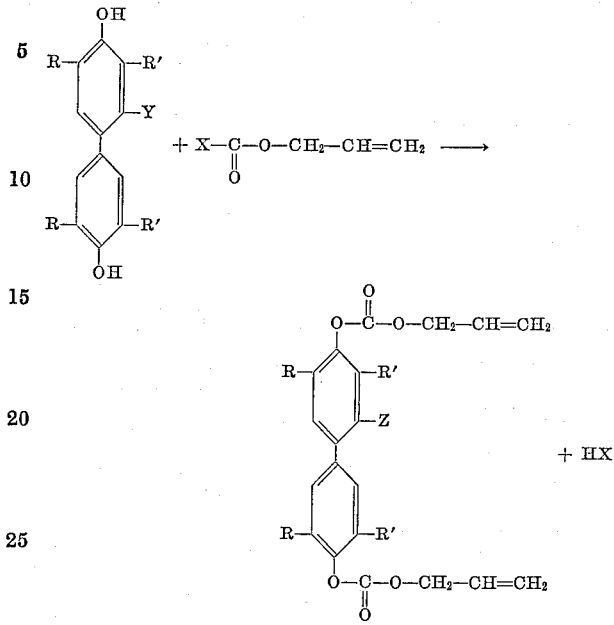

wherein R, R', Y, Z are the same as in Formulas I and II and X is a halide—i.e., chlorine, bromine, iodine or fluorine.

The reaction of the allyl haloformate with the diphenyl theoretically requires one mole of allyl haloformate for each —OH— group attached to the biphenyl compound. However, it has been found that the allyl haloformate should be present in large excess—i.e., 4–20 times more than the theoretical amount needed. The reaction can be carried out in any suitable solvent which is non-reactive with the reaction media. A preferred solvent is methylene chloride. Other suitable solvents include dimethyl sulfoxide, toluene, benzene, chloroform, etc.

During the reaction, a hydrogen halide acid is generated which should be neutralized as it is formed. This can be accomplished by the addition of an alkaline material to the solution. The material which I prefer to employ is pyridine.

The reaction should be carried out at approximately room temperature. Inasmuch as the reaction is exothermic, it is desirable to maintain a temperature of approximately 25° C. by immersing the reaction vessel in a water bath. After completion of the reaction, the material is washed with water to remove inorganic impurities. The reaction mixture is then concentrated to remove the solvent and unreacted materials. Hexane or cyclohexane is then added to crystallize the product which can be filtered from solution.

The allyl carbonates of this invention are white crystalline solids. They have found utility as chemical intermediates in a number of processes and also, have been found to be valuable as crosslinking agents in the curing of polymers.

The following examples are illustrative of the process for forming the allyl carbonates of my invention.

Example 1

In this example, 12.1 g. (0.05 mole) of 3,3',5,5'-tetramethyl-4,4'-dihydroxybiphenyl were mixed with 15.8 g. (0.2 mole) of pyridine and 200 ml. of methylene chloride. To this mixture, 48.4. (0.4 mole) of allyl chloroformate in 50 ml. of methylene chloride were added over a period of two hours. Throughout the addition, the temperature was maintained below 25° C. by use of a water bath. Thereafter, the mixture was allowed to stand for twenty-one hours to insure complete reaction. In order to wash the reaction mixture and remove inorganic impurities, 300 ml. of water were added to the mixture. Two layers formed. The water layer was separated from the organic layer and the organic layer washed with three 200 ml. portions of 1 N hydrochloric acid followed by three 200 ml. portions of water. The organic layer was dried by the addition of anhydrous sodium sulfate. After drying, the anhydrous sodium sulfate was removed by filtration and the organic layer was concentrated to dryness. The yield was 20.14 g. of a light yellow solid. To purify this crude solid, it was dissolved in 250 ml. of cyclohexane and crystalized by distilling off the cyclohexane. The resulting solid weighed 7.09 g. and had a melting point of 145–150° C. This range of five degrees C. indicated that the product was somewhat impure. An analysis was performed and the folowing results obtained: Calculated for $C_{14}H_{26}O_6$: C, 70.23; H, 6.39. Found: C, 71.10; H, 6.54.

*Example 2*

In this example, 12.9 g. (0.05 mole) of 3,3',5,5'-tetramethyl-2,4,4'-trihydroxybiphenyl were mixed with 35.6 g. (0.45 mole) of pyridine and 200 ml. of methylene chloride. To this mixture, 54.5 g. (0.5 mole) of allyl chloroformate dissolved in 50 ml. of methylene chloride were added over a period of two hours. Throughout the addition of the allyl chloroformate solution, the temperature of the mixture was maintained at 25° C. by immersion of the reaction vessel in a water bath. This mixture was then allowed to stand overnight at room temperature. During this period, solid formed in the reaction vessel. Thereafter, 400 ml. of water were added and two layers formed. The organic layer was separated and washed three times with 250 ml. of 1 N hydrochloric acid. Thereafter, the organic layer was dried with anhydrous sodium sulfate. The anhydrous sodium sulfate was filtered from the organic layer and the organic layer was concentrated to an amber syrup which did not crystallize when stored in a refrigerator with 25 ml. of cyclohexane. It was found that the allyl carbonate of the trihydroxy could not be precipitated. This indicated that the reaction was not complete. Therefore, the reaction mixture was again dissolved in 200 ml. of methylene chloride and 17.8 g. of pyridine added. To this mixture 18.2 of allyl chloroformate were added over a period of thirty-two minutes. The reaction mixture was maintained at a temperature of 15–19° C. during this addition. Again, the mixture was left at room temperature overnight. Thereafter, the mixture was washed with 400 ml. of water, three 250 ml. portions of 1 N hydrochloric acid and four 250 ml. portions of water. The reaction mixture was then dried with anhydrous sodium sulfate, and concentrated on a rotary evaporator. When the side of the reaction vessel was scratched, the mixture became a pasty, yellow and white mass. Cyclohexane was added and a white solid was obtained. This material was filtered and weighed 12.1 g. It had a melting point of 62–64° C. After recrystallization from cyclohexane, a melting point of 63–65° C. was found. Infrared analysis showed no hydroxyl band. An analysis was performed and the following results obtained:

*Analysis.*—Calculated for $C_{28}H_{30}O_9$: C, 65.87; H, 5.92. Found: C, 66.52; H, 6.03.

It would, of course, be apparent to those skilled in the art that changes may be made in the particular embodiments of the invention described which are within the full intent and scope of the invention as defined by the appended claims.

What I claim as new and desire to secure by Letters Patent of the United States is:

1. A compound having the structural formula

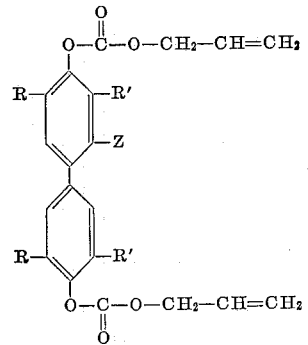

where R and R' are monovalent hydrocarbons selected from the group consisting of methyl, ethyl, propyl and butyl; and Z is a member selected from the group consisting of hydrogen and

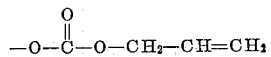

2. The compound of claim 1 wherein R and R' are methyl and Z is halogen.

3. The compound of claim 1 where R and R' are methyl and Z is

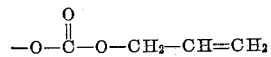

No references cited.

CHARLES B. PARKER, *Primary Examiner.*

B. BILLIAN, *Assistant Examiner.*